United States Patent [19]
Coleman

[11] 3,771,570
[45] Nov. 13, 1973

[54] FLEXIBLE CONDUIT
[75] Inventor: Neil Coleman, Highland Park, Ill.
[73] Assignee: Coleman Cable & Wire Co., River Grove, Ill.
[22] Filed: July 20, 1967
[21] Appl. No.: 654,879

[52] U.S. Cl. ................ 138/131, 264/173, 156/143, 156/244, 138/139
[51] Int. Cl. ............................................ F16l 11/14
[58] Field of Search .................... 138/129, 131–139; 264/134, 135, 173

[56] References Cited
UNITED STATES PATENTS
3,311,133   3/1967   Kinander ........................... 138/136
FOREIGN PATENTS OR APPLICATIONS
933,409   8/1963   Great Britain ..................... 264/173

OTHER PUBLICATIONS
Carlyon; George, "Fasteners and Adhesives", Fabricating and Finishing, p. 722–724 (copy in Pat. Off. Chem. Library).

Primary Examiner—Herbert F. Ross
Attorney—Anderson, Luedeka, Fitch, Even and Tabin

[57] ABSTRACT

A jacketed flexible convoluted metal hose construction has an intermediate layer bonded to the metal hose and to an extruded plastic jacket. The hose convolutions are extended from their most compressed condition so that relatively wide spacings are maintained therebetween, and displacement between the hose and the jacket on flexure of the conduit is prevented.

15 Claims, 5 Drawing Figures

Patented Nov. 13, 1973 3,771,570
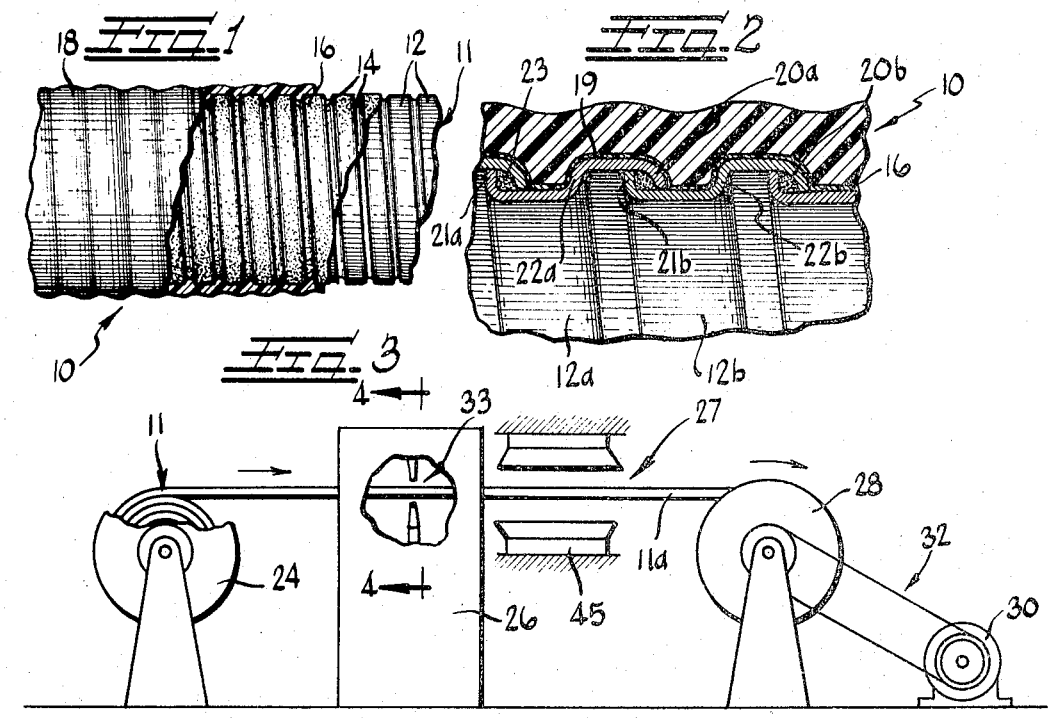
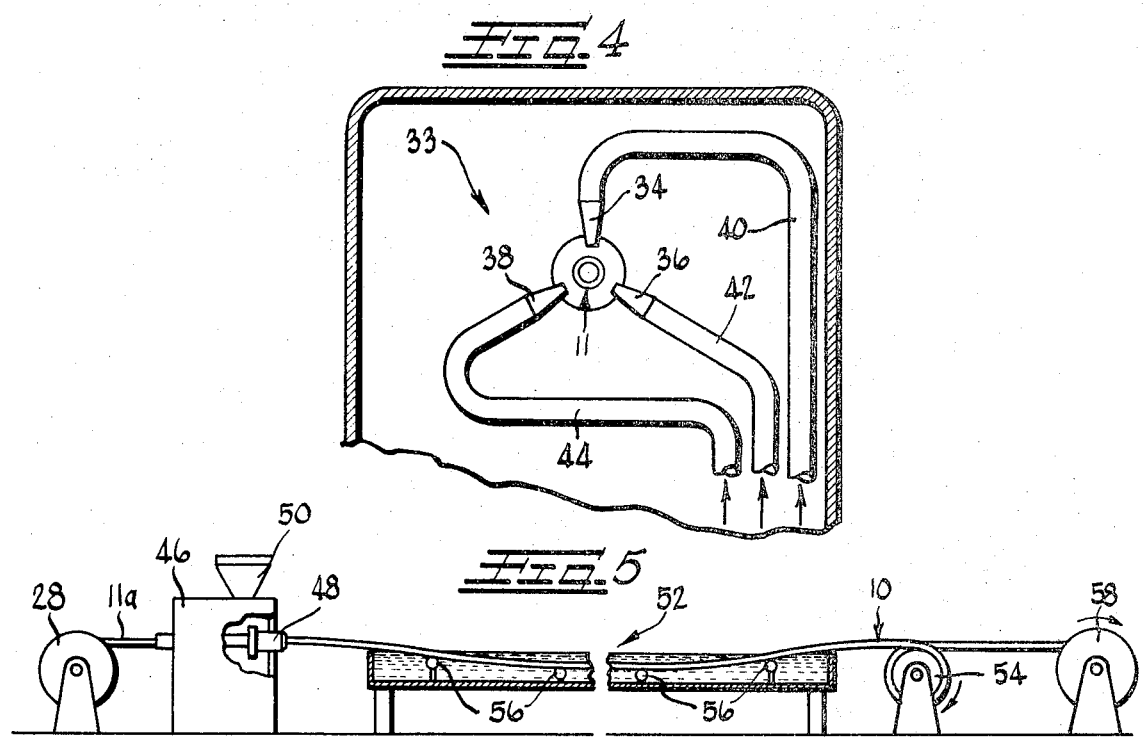
INVENTOR
Neil Coleman
BY Anderson, Luedeka, Fitch, Even, & Tabin
ATTORNEYS

FLEXIBLE CONDUIT

The present invention relates to jacketed flexible conduit, and to a method for making such conduit.

One type of jacketed flexible conduit heretofore known is commonly constructed by extruding a plastic jacket directly onto a metal hose of the strip-wound type. Such strip-wound metal hose is conventionally made by winding a metal strip about a mandrel and folding the strip longitudinally so that the edge portions of each convolution of the strip overlap and interlock with the folded edge portions of the preceding and succeeding convolutions. The flexibility of metal hose made in this fashion results from a limited freedom of each hose convolution to be displaced axially through the interlock portion with respect to adjacent convolutions, and also from a hinging action at the interlocks. Thus, the hose may be axially extended from a compressed position of minimum length, in which adjacent convolutions are in contact with each other, to a position of maximum length, in which the convolutions are prevented from further separation by the interlocks. When such metal hose is flexed or bent, there is generally an opening or separation of the adjoining convolutions at the outer or convex portion of the bend and a closing or compressing of the convolutions at the inner or concave portion of the bend. Metal hose of this type may contain a packing wound spirally within the overlap or interlock portions of the convolutions to increase the liquidtight or sealing qualities of the hose, and thus such packing may commonly be formed from a cotton twine or asbestos or, of course, any suitable rubber or plastic capable of performing this sealing function. In some constructions, it may be desirable for certain electrical grounding purposes to use a spirally wound copper conductor in the interlock portions of the hose.

Conduit of the type described, wherein such strip-wound metal hose is merely covered by a seamless jacket of flexible plastic by conventional extrusion procedures, has generally been less than fully satisfactory in several respects. In particular, when the plastic is extruded onto the outer surface of the hose, some of the plastic penetrates and fills the spaces or interstices between the convolutions of the hose as the hose is drawn through the extrusion apparatus. The penetrating portion of the plastic jacket forms a spiral rib along the length of the hose. When the resulting conduit is flexed or bent, the convolutions compress or move toward each other on the concave side of the bend and squeeze the rib away from the outer surface of the metal hose, producing objectionable wrinkling of the jacket in this area. Furthermore, and more serious, the rib portions of the jacket at the concave side of a bend tend to completely dislodge from their initial interstitial position between the convolutions, which dislodgment becomes permanent even upon straightening of the conduit. This dislodgment of the jacket from the hose (sometimes called "bagging") generally disqualifies the conduit for sale and renders the product a manufacturing reject.

A number of attempts have heretofore been made to construct jacketed flexible metal hose having a minimum of wrinkling and bagging. One such attempt is shown in U.S. Pat. No. 3,073,351, wherein the metal convolutions are tightly compressed during the extrusion process so that the plastic jacket is applied to the metal hose without any significant interstitial penetration, the jacket being retained in axial position relative to the metal hose only by the friction therebetween. In such constructions, it has been found that there is a tendency for relative displacement of the jacket and hose to occur at the ends of the conduit, which impairs the sealing qualities of the hose at the connectors which are generally attached thereto. Another construction is shown in U.S. Pat. No. 3,282,300, wherein the convolutions are maintained with only a slight separation and the plastic penetrates only partially into the interstices therebetween. Thus, the penetration of the plastic forms a spiral rib on the inner surface of the jacket as in the prior constructions hereinbefore mentioned, and although this tends to prevent axial displacement of the jacket relative to the hose, the problem of substantial bagging or permanent dislodgment of the rib from the hose at concave portions of a bend continues to be present.

Prior attempts at minimizing this problem by employing no, or only a very small, interstitial spacing, inherently increases the amount of metal hose per unit length of finished product, and thus are accompanied by a sacrifice of economy, and an increase in unit weight. Furthermore, the process of extrusion of the plastic jacket in these prior constructions becomes increasingly critical in adjustment wherein critical spacing of the convolutions is required or where the convolutions must be in their totally compressed position during the extrusion operation.

The present invention, in its broader aspects, stems from the recognition that the above-mentioned problems can be obviated while, at the same time, substantial economy is achieved in producing a flexible conduit of superior quality, by the utilization of an intermediate layer of a suitable elastic adhesive material between the metal hose and the plastic jacket. More particularly, it has been found that by applying this intermediate coating or layer to the metal hose while the adjoining convolutions of the hose are extended, and extruding the plastic jacket thereover so that the spiral rib formed between the hose convolutions is bonded to the coating, wrinkling or dislodgment of the rib on flexure is prevented. The intermediate layer is formed by a suitable primer having sufficient adhesive and cohesive strength to resist the radial forces tending to dislodge the rib from its interstitial position at the concave portion of a bend due to the compression of the adjacent convolutions thereat, and sufficient elasticity to elastically yield with flexure of the conduit. Although the radial movement of this part of the jacket is so restrained, the flexibility of the conduit, contrary to expectations, is still maintained. This appears to be due to cummulative axial compressions of the rib by the closing convolutions, and by the hinging action of the interlock portions of the metal hose on flexure.

The extended condition of the metal hose, which is preferably fully extended, provides a minimum of metal per unit length of conduit, resulting in substantial economies not heretofore possible in conjunction with the elimination of bagging and the high reject rate caused thereby.

The intermediate layer, in accordance with a further aspect of the invention, additionally provides increased sealing properties, ensuring the liquidtightness of the conduit.

These and other objects, aspects and advantages of the invention are particularly set forth in the following detailed description, and in the accompanying drawings, of which:

FIG. 1 is a view in elevation of a jacketed flexible conduit partially broken away in section to show a construction in accordance with an embodiment of the present invention;

FIG. 2 is an expanded fragmentary longitudinal sectional view of the conduit of FIG. 1;

FIG. 3 is a more or less schematic view in elevation of a portion of the apparatus used in making the conduit in accordance with the present invention;

FIG. 4 is a sectional view taken along the line 4—4 in FIG. 3, in the direction of the arrows;

FIG. 5 is a more or less schematic view in elevation showing further apparatus for making the conduit in accordance with the present invention.

Referring now to FIG. 1, there is generally shown a jacketed flexible conduit 10 comprising a helically convoluted metal hose or tube 11 having each convolution 12 axially movable relative to adjoining convolutions. The metal tube 11 is extended from its most compressed condition so that adjoining convolutions 12 are spaced apart to form full interstices 14 therebetween. A coating or layer 16 is bonded to the outer surfaces of the tube 11, which has sufficient elasticity to elastically or resiliently yield with flexure of the tube. A plastic jacket 18 is bonded to the outer surfaces of the layer 16, the latter having sufficient adhesive and cohesive properties to restrain relative movement between the jacket 18 and the tube 11 during flexure of the conduit.

More particularly, as illustrated in FIGS. 1 and 2, the tube 11 is formed from strip-wound metal hose of the type previously described, having the adjoining convolutions 12a, 12b, etc., longitudinally disposed along its entire length and the interstitial spaces 14 opening outwardly or externally from the metal hose 11 between successive convolutions. The relatively movable convolutions 12 have a generally "S" configuration in longitudinal section, and an outer surface 19, outer and inner radial edges 20 and 21, and an intermediate portion 22. The opposite radial edges of adjacent convolutions 12a, 12b, etc., form the interlocking portions of the hose 11. A flexible spiral member or packing 23 of, for example, cotton twine is spirally disposed within the interlocking portions of the hose to serve as a seal, as is conventional.

The plastic jacket 18 is extruded on to the intermediate layer 16, penetrating and preferably completely filling the interstitial spaces 14, which are relatively widely spaced, such wide interstitial spacing being achieved in a manner to be hereinafter described.

The intermediate layer 16 is composed of an adhesive which is preferably, but not necessarily, a plastisol primer; that is, a primer generally intended for bonding metal to a polyvinyl chloride resin which is dispersed in a liquid plasticizer to form a liquid or paste, but generally having a relatively low viscosity and being in liquid form for molding. However, as utilized in accordance with the present invention, the plastisol primer is not used in conjunction with a plastisol, but with an extruded polyvinyl chloride compound. One preferred material is a plastisol primer of the B. F. Goodrich Industrial Products Company, Product No. A-1104-B. This primer has a resin base in a solvent of methyl ethyl ketone, the total solids being 18 to 20 percent. The dry coating forming layer 16, when composed of this material, has a specific gravity of about 1.19 and a Durometer hardness of approximately 90.

Other materials tried and found to be satisfactory are Solar 1200 (Solar Compounds Corporation, Linden, New jersey); Rucothane 510–40 (Rubber Corporation of America, Hicksville, L.I., New York); Elprene (The Electric Storage Battery Company, Atlas Minerals & Chemical Division); 4025 and 4040 (JSM Chemical Company, Middleton, Massachusetts); PC-1190 (Daubert Chemical Company, Oak Brook, Illinois); A-1104B (B. F. Goodrich Industrial Products Company, Akron, Ohio); MF-270 (Research Sales, Inc., Suffern, New York); Jeobond 7617 (Jedco Chemical Corporation, Mount Vernon, New York); Loxite 7019 (Xylos Rubber Company, Akron, Ohio); Bondmaster 6414 (Pittsburgh Plate Glass Company, Adhesive Products Division, Broomfield, New Jersey); and CD Cement No. 203 (Chemical Development Corporation, Danvers, Massachusetts). This list is, of course, not exhaustive of suitable materials, and thus other equivalent materials may be apparent to persons skilled in the art based on the teachings of the present invention.

As shown in FIG. 3, the bare strip-wound metal hose 11 is disposed on a tension feed reel 24 of the coating apparatus 25, passed through spraying apparatus 26, drying area 27, and wound on a take-up reel 28 which is driven in the direction of the arrows by any suitable motor and driving mechanism 30 through a transfer means such as the belt and pulley arrangement 32. The metal hose 11 is pulled through this apparatus under tension so that desirably the convolutions are substantially fully extended and a wide interstitial spacing is thus formed. The opposite radial edges 20a and 21b of adjacent hose convolutions compress the packing 23, forming a tight sealing relation, and the axial displacement of the adjoining convolutions is preferably at least three-quarters of their maximum extension without the packing.

The spraying apparatus applies the elastic adhesive coating 16 to the exterior surfaces of the metal hose 11. This may be accomplished by means of a plural nozzle arrangement 32, as shown in FIG. 4, comprising three spray nozzles 34, 36, and 38, equally spaced in a "Y" configuration about the periphery of the hose 11. Each of the spray nozzles 34, 36, and 38 are supplied through feed tubes 40, 42, and 44 from a common source (not shown). Because the material being sprayed is generally highly flammable (the preferred primer previously mentioned having a flash point of 44°F), the spraying is performed in an enclosure, as shown. In the present eembodiment of the invention, the primer is applied with a relative uniform wet thickness of about 1.5 mils., which upon drying has a thickness of less than 1.0 mil., being typically about 0.3 mil. The coating is applied to cover the entire external surface of the metal hose fully extended. Other methods of application may of course be used, but generally less advantageously. As shown in FIGS. 1 and 2, the layer 16 has a thickness which is substantially less than that of the jacket 18.

After application of the primer, the coated hose enters the drying area 27 where the solvent is evaporated and the intermediate layer 16 forms a bond to the metal hose 11. The drying may be accomplished by the use of radiant heat lamps 45, as shown, or by forced-air convection. Alternatively, the drying may be accomplished without any auxiliary equipment, and thus the hose is merely wound on the take-up reel 28, having been merely air-dried. When dry, the coating 16 loses its exterior adhesive properties, retaining its bond to the metal, but having no tendency to bond to the adjacent turns of hose on the take-up reel 28. Thus, the coated hose on take-up reel 28 may be stored after removal from the coating apparatus 25 until it is desired to complete the conduit construction.

When desired, the reel 28 is placed in the feed position of conventional extrusion apparatus, as shown in FIG. 5. The coated hose, shown as 11a, is fed through a plastic extruder 46 having an extruding head 48 with suitable dies which receive molten plastic formed from pellets which are fed into hopper 50. The plastic, preferably polyvinyl chloride (typically, in the present embodiment, being compounds 8894 or 2042B of the B. F. Goodrich Chemical Company), is extruded onto the hose 11a, over the coating 16 to form a seamless jacket. The heat of the plastic, which is applied to the primer coating 16, is sufficient to reactivate the adhesive properties of the coating on its exterior surface adjacent the applied plastic so that the extruded plastic is bonded thereto without affecting, to any practical extent, the bonded relation between the coating 16 and the metal hose 11. In the method according to the present embodiment of the invention, the temperature of the plastic stock fed to the extruding head 48 is desirably not in excess of 350°F.

The extruded plastic fills the interstices 14, as shown in FIG. 2, between the radial edges 20a, 20b, etc., and the intermediate portions 22b, 22c, etc., between each convolution. The plastic is extruded onto the coated hose 11a at a constant rate, and thus a spiral ridge or corrugation is formed on the exterior surface of the jacket, generally conforming to the convolutions of the metal hose thereunder. However, a smooth exterior jacket surface may alternatively be provided by the use of suitable dies in the extruding head 48.

After leaving the extruding head 48, the conduit is fed to a water trough, generally indicated as 52, and from which it is wrapped about a capstan 54, driven by any suitable means (not shown), which pulls the finished conduit 10 through the extrusion operation. The hose is maintained under sufficient tension to maintain the convolutions at substantially their full extension during extrusion. The finished conduit is then wound on a tension reel 58. More specifically, although the coating 16 is applied by coating apparatus 25 with the hose under tension, extending the convolutions 12 with respect to one another, after the hose is wound on the take-up reel 28, the resilient property of the packing and the inherent nature of the metal hose generally causes some degree of compression of the convolutions on returning to their normal state. During extrusion, however, the convolutions 12 of the hose are once again put under tension, so as to result in a conduit construction wherein the convolutions are preferably totally extended.

To achieve good bonding between the adhesive layer 16, the plastic jacket 18, and the metal hose 11, it is desirable to provide sufficient cooling of the conduit before it is significantly flexed, and thus the conduit is fed to the water through 52 with a miminum of flexure or bending by means of rollers 56. The water trough 2 is maintained at a generally cool and even temperature, as is well-known in conventional extruding methods, and for the present purpose is desirably approximately 60 feet in length.

As can be seen, the extrusion may be carried out in generally conventional fashion, with normal pulling, and without maintaining any critical interstitial spacings. By extruding the plastic with the convolutions of the coated metal hose fully extended, which is accomplished by mere tension, a minimum of metal hose is required per foot of completed conduit. The elastic adhesive coating bonded between the metal hose and the plastic jacket enhances the sealing qualities of the conduit and permits greater internal fluid pressures than would be otherwise permitted. Wrinkling and dislodgment of the jacket at concave portions of a bend is prevented, and thus manufacturing rejects from this cause are substantially, if not completely, eliminated.

Although the present embodiment of the invention herein described employs one type of convoluted flexible metal hose, other types having a different appearance may, of course, be substituted therefor. Further, although the coated hose 11a may be stored before extrusion of the jacket, all of the process steps may be alternatively carried out as part of a single continuous process. Other modifications of the present invention, in its various aspects, will be apparent to those skilled in the art, and accordingly, the scope of the invention should be defined only by the appended claims and equivalents thereof.

Various of the features of the invention are set forth in the following claims.

What is claimed is:

1. A flexible conduit comprising a convoluted metal tube having each convolution axially movable relative to adjoining convolutions, said tube being extended from its most compressed condition so that adjoining convolutions are spaced apart to form full interstices therebetween, an adhesive layer bonded to the outer surface of said tube at least within the regions of said interstices, said adhesive layer having sufficient elasticity to elastically yield with flexure of the tube, and a seamless plastic jacket having a portion thereof fully extending into said interstices and bonded to the outer surfaces of said layer, said layer having sufficient adhesive and cohesive properties to resist the radial forces acting on said portion of the jacket extending into said interstices at the concave portion of a bend due to the compression of adjacent tube convolutions so that the occurrence of significant relative radial displacement between said jacket and said tube on flexure of the conduit is substantially prevented.

2. The flexible conduit according to claim 1 wherein said adjoining convolutions of the convoluted metal tube are extended to at least three-quarters of their maximum extension.

3. The flexible conduit according to claim 1 wherein said metal tube is helically convoluted, having interlocking portions between the convolutions, and a flexible spiral member disposed within said interlocking portions, said convolutions being extended to substantially their full extension.

4. The flexible conduit according to claim 1 wherein said adhesive layer is disposed with a generally uniform thickness over the entire outer surface of said metal tube.

5. The flexible conduit according to claim 4 wherein the dry thickness of said adhesive layer is less than 1.0 mil.

6. The flexible conduit according to claim 1 wherein said adhesive layer is composed of a plastisol primer, and said plastic jacket is extruded and bonded thereto.

7. The flexible conduit according to claim 1 wherein the dry thickness of said adhesive layer is substantially less than that of said plastic jacket.

8. The flexible conduit according to claim 1 wherein said adhesive layer is composed of a resinous material.

9. A method of making a flexible conduit comprising the steps of extending a metal tube having convolutions which are axially movable relative to adjoining convolutions from its compressed condition so that adjoining convolutions are spaced apart to form full interstices therebetween, bonding an elastic adhesive layer to the outer surfaces of said metal tube at least within the regions of the interstices while the tube is in said extended condition, and bonding a seamless jacket of plastic material to the outer surfaces of said layer so that a portion thereof fills the interstices, said layer having sufficient elasticity to elastically yield with flexure of the tube and sufficient adhesive and cohesive properties to resist the radial forces acting on said portion of the jacket extending into said interstices at the concave portion of a bend due to the compression of adjacent tube convolutions so that the occurrence of significant relative radial displacement between said jacket and said tube on flexure of the conduit is substantially prevented.

10. The method according to claim 9 wherein said elastic adhesive is composed of a resin base in a solvent, and said method comprises evaporating said solvent before bonding said jacket to said layer.

11. The method according to claim 9 wherein the jacket of plastic material is extruded onto said layer while the conduit is under tension, so that the convolutions of the tube are in an extended condition.

12. The method according to claim 11 wherein the conduit is under sufficient tension during extrusion to substantially fully extend the convolutions of the tube.

13. The method according to claim 11 wherein the elastic adhesive is composed of a plastisol primer being characterized by reactivation of adhesive properties on the application of heat from the extruded plastic.

14. The method according to claim 9 wherein said elastic adhesive layer is applied with a dry thickness substantially less than the thickness of said jacket.

15. The method according to claim 9 wherein said elastic adhesive layer is applied with a dry thickness less than 1.0 mil.

* * * * *